(No Model.)

A. J. RUSSELL.
GATE.

No. 502,206. Patented July 25, 1893.

Witnesses
Arthur Ashley
H. T. Riley

Inventor
A. J. Russell
By his Attorneys,
C. A. Snow & Co.

UNITED STATES PATENT OFFICE.

ANDREW J. RUSSELL, OF EDGERTON, OHIO.

GATE.

SPECIFICATION forming part of Letters Patent No. 502,206, dated July 25, 1893.

Application filed June 7, 1893. Serial No. 476,843. (No model.)

*To all whom it may concern:*

Be it known that I, ANDREW J. RUSSELL, a citizen of the United States, residing at Edgerton, in the county of Williams and State of Ohio, have invented a new and useful Gate, of which the following is a specification.

The invention relates to improvements in gates.

The object of the present invention is to improve the construction of gates and to provide a simple and inexpensive one adapted to be readily opened without the necessity of walking but a few steps, and capable of being readily adjustable to afford a passage for small animals, and to enable it to clear snow-drifts and other obstructions.

The invention consists in the construction and novel combination and arrangement of parts hereinafter fully described, illustrated in the accompanying drawings, and pointed out in the claims hereto appended.

Figure 1:
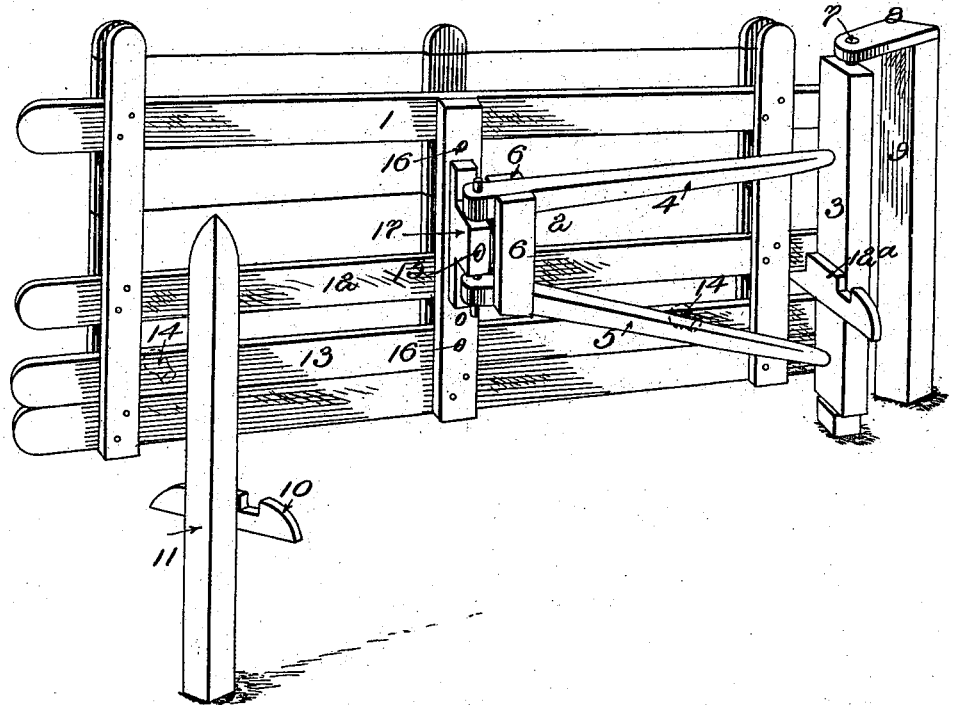
Figure 2:
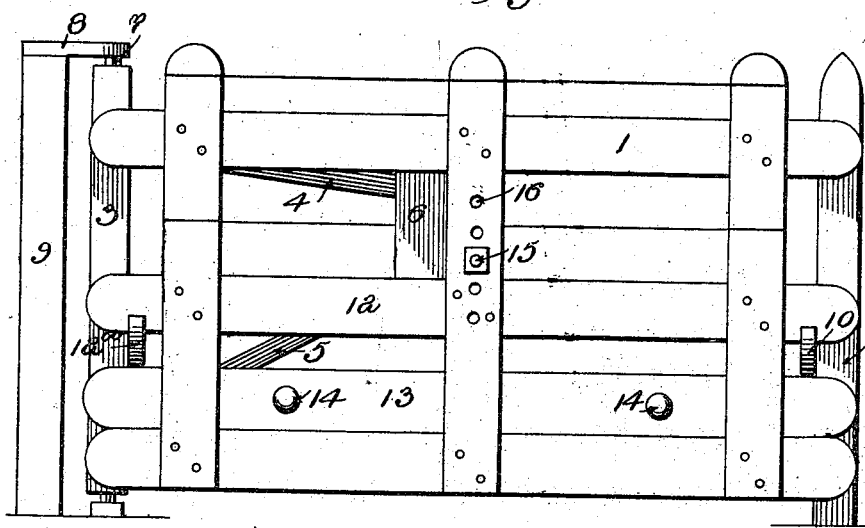
Figure 3:
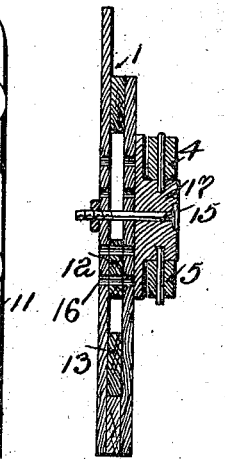

In the drawings: Figure 1 is a perspective view of a gate constructed in accordance with this invention and shown partly open. Fig. 2 is a side elevation, the gate being closed.

Similar numerals of reference indicate corresponding parts in the two figures of the drawings.

1 designates a gate, which is centrally and adjustably hinged to the outer end of a hanger 2, which consists of a vertical pivot-post 3, upper and lower inclined bars 4 and 5, and connecting pieces 6, secured to the inclined bars at opposite sides of the same a short distance from their outer ends. The pivot-post 3 has its lower end shaped into a journal and its other end receives a depending pivot 7, of an arm 8, of a post 9, and it is adapted to turn to permit the gate to be opened and to be turned end for end to enable either end of the gate to engage a keeper 10, of a latch-post 11.

The gate may be of any desired construction, but preferably consists of vertical bars and horizontal rails and is provided with wires which may have barbs; and it has a rigid latch-bar 12. The rigid latch-bar 12 extends from opposite ends of the gate and its projecting portion is adapted to engage either of the recesses of the keeper 10 of the latch-post 11, or a similar keeper 12ª of the hanger. The keepers 10 and 12ª project from opposite sides of the latch-post 11 and the pivot-post 3 of the hanger; they have their ends beveled and are provided at each end with a recess to receive an end of the rigid latch-bar 12 of the gate, the latter being pivotally mounted on the outer end of the hanger and adapted to be lifted to engage the keepers and to clear obstructions.

The gate is secured, when latched, by a longitudinally-movable locking-bar 13, which is slidingly mounted on the gate below the latch-bar 12 a sufficient distance to lie below the keepers when the gate is latched to prevent the gate being lifted by a hog or other animal and being opened. The sliding locking-bar 13 is provided adjacent to each end with a handle 14, which serves as a stop to limit the movement of the locking-bar. In unlatching the gate the locking-bar is moved backward a sufficient distance to enable the latch-bar to be lifted out of engagement with the keeper 10, and after the gate is partially open it is moved forward to enable the other end of the latch-bar to be disengaged from the keeper 12ª. In latching the gate the locking-bar is first engaged under the keeper 12ª, and is then moved beneath the other keeper without becoming disengaged from the keeper 12ª, thereby securely fastening the gate.

The gate has adjustably secured to it by a pivot-bolt 15 and perforations 16 a bracket 17, which is provided at its upper and lower ends with recesses to receive the extended ends of the upper and lower inclined bars 4 and 5, and the latter are pivoted to the vertically-disposed bracket.

It will be apparent that the gate is simple and comparatively inexpensive in construction, that it may be readily manufactured without employing the ordinary form of hinges or hinge-castings, that it is capable of vertical adjustment, and that it is securely fastened when latched. It will also be apparent that the gate may be readily tilted or shifted over any obstruction which may lie in its path to enable it to be readily opened.

Changes in the form, proportion, and the minor details of construction may be resorted to without departing from the principle or sacrificing any of the advantages of this invention.

What I claim is—

1. The combination of a hanger having a vertical pivot-post, a gate centrally hinged to the outer end of the hanger and having a rigid latch-bar, a latch-post, double keepers secured to the latch and pivot posts and projecting from opposite sides thereof and adapted to be engaged by the latch-bar of the gate, and a locking-bar slidingly mounted on the gate and arranged below the keepers and adapted to engage the lower edges of the same to prevent the latch-bar being lifted out of engagement with them, substantially as described.

2. The combination of a hanger having a vertical pivot-post, a gate centrally hinged to the outer end of the hanger and provided with a rigid latch-bar projecting from its ends, a latch-post, the double keepers secured to the latch and pivot posts and provided at their upper edges with recesses and having beveled ends and adapted to be engaged by the projecting ends of the latch-bar, and a locking-bar slidingly mounted on the gate and adapted to engage the lower edges of the keepers and having handles forming stops, substantially as described.

In testimony that I claim the foregoing as my own I have hereto affixed my signature in the presence of two witnesses.

ANDREW J. RUSSELL.

Witnesses:
LEE BRYAN,
ELI A. JONES.